US010063271B1

(12) United States Patent
    Goldshtein

(10) Patent No.: US 10,063,271 B1
(45) Date of Patent: Aug. 28, 2018

(54) WEARABLE CELL PHONE COVER

(71) Applicant: Ruth Goldshtein, Plantation, FL (US)

(72) Inventor: Ruth Goldshtein, Plantation, FL (US)

( * ) Notice: Subject to any disclaimer, the term of this patent is extended or adjusted under 35 U.S.C. 154(b) by 0 days.

(21) Appl. No.: 15/490,424

(22) Filed: Apr. 18, 2017

(51) Int. Cl.
    *H04B 1/3888* (2015.01)
    *H04M 1/02* (2006.01)

(52) U.S. Cl.
    CPC ........ *H04B 1/3888* (2013.01); *H04M 1/0202* (2013.01)

(58) Field of Classification Search
    USPC ................................ 455/575.1, 575.4, 575.8
    See application file for complete search history.

(56) References Cited

U.S. PATENT DOCUMENTS

| | | | | |
|---|---|---|---|---|
| 6,035,449 | A * | 3/2000 | Galler ................... | A41D 27/08 2/247 |
| 6,233,747 | B1 * | 5/2001 | Barker .................. | A41D 27/20 2/247 |
| D537,610 | S * | 3/2007 | Escamillo ............. | B57D 2/857 |
| 7,854,021 | B2 * | 12/2010 | Compton ............... | G09F 21/02 2/243.1 |
| D686,392 | S * | 7/2013 | Scarborough .......... | B57D 2/857 |
| 8,646,971 | B2 * | 2/2014 | Doyle ................... | B65D 33/24 383/38 |
| 2008/0119244 | A1 * | 5/2008 | Malhotra ............. | B29C 45/0053 455/575.1 |
| 2009/0095751 | A1 * | 4/2009 | Hamlin ................ | A45C 13/1069 220/230 |
| 2010/0085697 | A1 * | 4/2010 | Park ..................... | G06F 1/1616 361/679.27 |
| 2014/0159839 | A1 * | 6/2014 | Kim .................... | H04B 1/3888 335/219 |
| 2014/0171157 | A1 * | 6/2014 | Ho ....................... | H04M 1/04 455/573 |
| 2014/0287801 | A1 * | 9/2014 | Ho ....................... | H04B 1/3883 455/573 |
| 2014/0312083 | A1 * | 10/2014 | Scott ................... | A45F 5/021 224/183 |

(Continued)

OTHER PUBLICATIONS

Compare iPhone Models, Retreived from <https://www.apple.com/iphone/compare/> on Jul. 23, 2017.*

*Primary Examiner* — Nay A Maung
*Assistant Examiner* — Erica Fleming-Hall
(74) *Attorney, Agent, or Firm* — Mark C. Johnson; Johnson |Dalal

(57) ABSTRACT

A wearable cell phone case having a first layer with at least one rear lower magnet disposed proximal to a lower end thereof and at least one rear upper magnet disposed proximal to the upper end thereof and a second layer defining an upper end aperture and having at least one front lower magnet disposed proximal to a lower end thereof and at least one front upper magnet disposed proximal to an upper end thereof, wherein the magnets have opposing polarity. The second layer also defines an enclosed internal cavity spatially coupled to the upper end aperture, wherein the enclosed internal cavity is shaped and sized to house a cellular phone. The case also includes a layer coupling configuration with the first layer removably coupled to the second layer through the magnets disposed in overlapping configurations and with an article of clothing interposed in between said first and second layers.

17 Claims, 6 Drawing Sheets

(56) References Cited

U.S. PATENT DOCUMENTS

| | | | |
|---|---|---|---|
| 2015/0111623 A1* | 4/2015 | Hegemier | H04M 1/0283 |
| | | | 455/575.1 |
| 2015/0380141 A1* | 12/2015 | Mayfield | A45C 11/00 |
| | | | 361/679.01 |
| 2016/0020810 A1* | 1/2016 | Platt | H04B 1/3888 |
| | | | 455/556.1 |
| 2016/0072933 A1* | 3/2016 | Cox | H04M 1/185 |
| | | | 455/575.8 |
| 2017/0019513 A1* | 1/2017 | Slaby | H04M 1/0283 |
| 2017/0231290 A1* | 8/2017 | Jensen | A41B 15/00 |
| | | | 2/249 |

\* cited by examiner

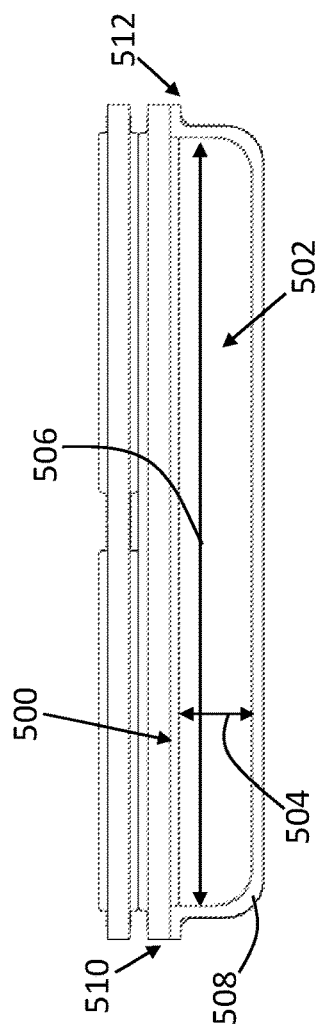
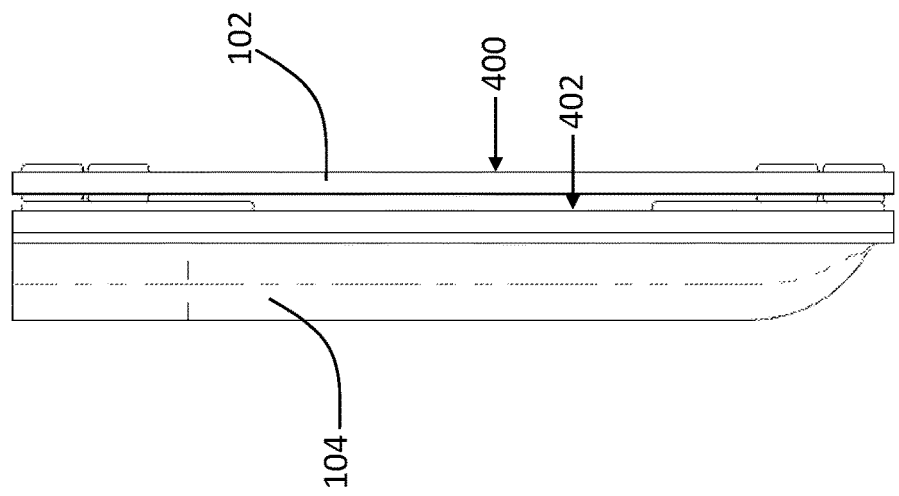

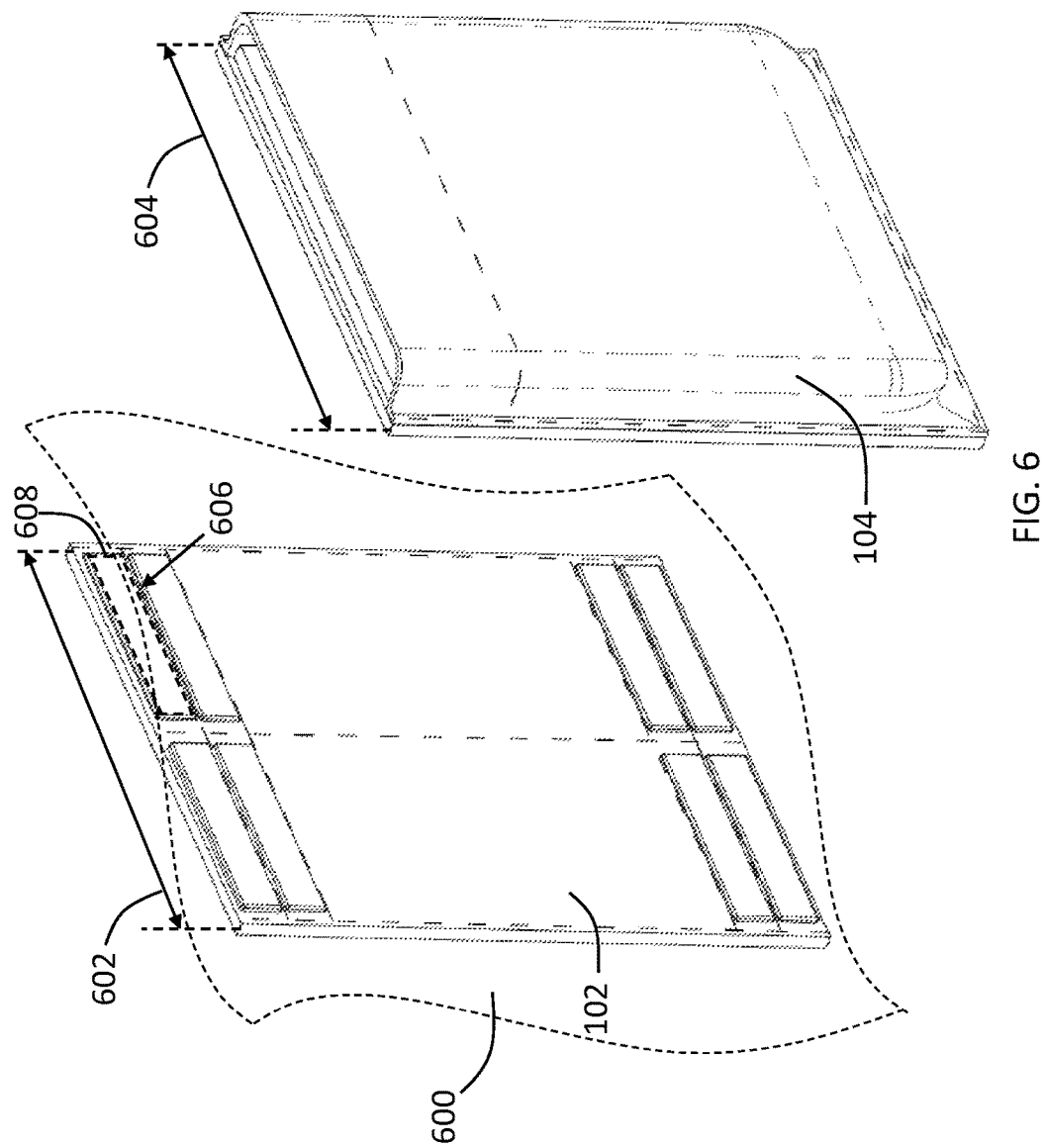

WEARABLE CELL PHONE COVER

FIELD OF THE INVENTION

The present invention relates generally to cellular (or "cell") phone cases, and, more particularly, relates to a wearable and removable cell phone case.

BACKGROUND OF THE INVENTION

Since the advent of the mobile phone, or cell phone, owners of said phones have desired to store and/or carry these phones in a safe, fashionable, and functional manner. In most instances, these phones are carried or worn by the user. Many users simply insert the cell phone in a pocket of their clothing, e.g., the rear or front pocket. Storing the phone in this manner, however, has many disadvantageous. It is often difficult to access the cell phone because of the location or placement of the phone in the user's pocket. The location and/or placement of the phone also inhibits the user's natural movements. Moreover, many users forget the cell phone is in their pocket and sit or move in a way that increases the likelihood of damaging the cell phone, particularly the display screen of the cell phone.

The most common device employed by users to help keep a cell phone protected, yet be readily accessible, is a mobile phone case. These phone cases come in various shapes and sizes, and have various functions. Some known cases are designed to house the cell phone, but do not provide a user the ability effectively carry the cell phone. As such, the user experiences many of the above-described disadvantages. Some known cases are configured in the form of holsters, designed to be worn by the user, often around the waist of the user. The holsters, however, are often uncomfortable to wear, and are difficult to access in order to reach the mobile phone housed therein. Moreover, these holders are often cumbersome and found to be unattractive by many users.

Therefore, a need exists to overcome the problems with the prior art as discussed above.

SUMMARY OF THE INVENTION

The invention provides a wearable cell phone cover that overcomes the hereinafore-mentioned disadvantages of the heretofore-known devices and methods of this general type and that provide a user to effectively and efficiently store and transport a cell phone on a user in an appealing and desired manner.

With the foregoing and other objects in view, there is provided, in accordance with the invention, a wearable cell phone case or cover is disclosed that includes a substantially planar first layer with a lower end, an upper end opposing the lower end of the first layer, a rear surface, and a front surface opposing the rear surface, wherein both the front and rear surfaces encapsulate at least one rear lower magnet disposed proximal to the lower end of the first layer and at least one rear upper magnet disposed proximal to the upper end of the first layer. The cover also includes a substantially planar second layer with a lower end, an upper end opposing the lower end of the second layer and defining an upper end aperture, a rear surface, and a front surface opposing the rear surface and of a fabric material, wherein both the front and rear surfaces of the second layer encapsulate at least one front lower magnet disposed proximal to the lower end of the second layer and at least one front upper magnet disposed proximal to the upper end of the second layer. The at least one front lower magnet has an opposite polarity to a polarity of the at least one rear lower magnet and the at least one front upper magnet having an opposite polarity to a polarity of the at least one rear upper magnet, wherein the second layer defines an enclosed internal cavity spatially coupled to the upper end aperture, wherein the enclosed internal cavity shaped and sized to house a cellular phone with a length less than approximately seven inches and a width less than approximately five inches. Moreover, the cover includes a layer coupling configuration along a layer coupling path with the front surface of the first layer removably coupled to the rear surface of the second layer and with the at least one rear and front lower magnets disposed in an overlapping configuration and with the at least one rear and front upper magnets disposed in an overlapping configuration.

In accordance with a further feature of the present invention, the rear surface of the first layer is of a fabric material.

In accordance with another feature, an embodiment of the present invention includes each of the at least one rear and front lower and upper magnets having an outer perimeter defining a magnet area, wherein the magnet area of the at least one front upper magnet is greater than or equal to the magnet area of the at least one rear upper magnet and the magnet area of the at least one front lower magnet is greater than or equal to the magnet area of the at least one rear lower magnet.

In accordance with yet another feature, an embodiment of the present invention also includes at least two rear lower magnets disposed in a juxtaposed and independently mobile configuration and at least two rear upper magnets disposed in a juxtaposed and independently mobile configuration, wherein the layer coupling configuration includes the at least two rear lower magnets and the at least one front lower magnet disposed in the overlapping configuration and includes the at least two rear upper magnets and the at least one front upper magnet disposed in the overlapping configuration.

In accordance with an additional feature, an embodiment of the present invention also includes each of the at least two rear lower and upper magnets and each of the at least one front lower and upper magnets having an outer perimeter defining a magnet area, wherein the magnet area of the one or more front upper magnet(s) is greater than or equal to magnet areas of the one or more rear upper magnet(s) and the magnet area of the one or more front lower magnet(s) is greater than or equal to the magnet areas of the one or more two rear lower magnet(s).

In accordance with a further feature of the present invention, the at least two rear lower and upper magnets and the at least one front lower and upper magnets are restrained about their respective outer perimeters through stitching into or onto the respective first or second layer.

In accordance with yet another feature, an embodiment of the present invention also includes at least two front lower magnets disposed in a juxtaposed and independently mobile configuration, at least two front upper magnets disposed in a juxtaposed and independently mobile configuration, at least two rear lower magnets disposed in a juxtaposed and independently mobile configuration, and at least two rear upper magnets disposed in a juxtaposed and independently mobile configuration. In such a configuration, the layer coupling configuration may include the at least two rear and front lower magnets disposed in respectively independent and overlapping configurations and include the at least two rear and front upper magnets are disposed in respectively independent and overlapping configurations.

In accordance with yet another feature, an embodiment of the present invention also includes the cover having a 2×2 array of rear lower magnets disposed in a vertically and horizontally juxtaposed and independently mobile configuration and a 2×2 array of rear upper magnets disposed in a vertically and horizontally juxtaposed and independently mobile configuration, wherein the layer coupling configuration includes the 2×2 array of rear lower magnets and the at least one front lower magnet disposed in the overlapping configuration and the 2×2 array of rear upper magnets and the at least one front upper magnet disposed in the overlapping configuration.

In accordance with a further feature, an embodiment of the present invention also includes the second layer having a left-side edge and a right-side edge opposing the left side edge, and has a front flap including the front surface of the fabric material and spanning from the left-side edge of the second layer to the right-side edge of the second layer, wherein the front flap has an inner surface defining the enclosed internal cavity.

In accordance with the present invention, an improved wearable cell phone cover in combination of an article of clothing of a user having a rear surface and a front surface opposing the rear surface is disclosed. The improvement includes a wearable cell phone case with a first layer with a lower end, an upper end opposing the lower end of the first layer, a rear surface, and a front surface opposing the rear surface of the first layer. The improvement also includes at least one rear lower magnet coupled to the front surface of the first layer and disposed proximal to the lower end of the first layer and at least one rear upper magnet coupled to the front surface of the first layer and disposed proximal to the upper end of the first layer. Additionally, the improvement includes a second layer with a lower end, an upper end opposing the lower end of the second layer and defining an upper end aperture, a rear surface, and a front surface opposing the rear surface. Moreover, the improvement includes at least one front lower magnet coupled to the rear surface of the second layer and disposed proximal to the lower end of the second layer and at least one front upper magnet coupled to the rear surface of the first layer and disposed proximal to the upper end of the second layer, wherein the at least one front lower magnet has an opposite polarity to a polarity of the at least one rear lower magnet and the at least one front upper magnet has an opposite polarity to a polarity of the at least one rear upper magnet. Moreover, the second layer defines an enclosed internal cavity spatially coupled to the upper end aperture, wherein the enclosed internal cavity shaped and sized to house a cellular phone with a length less than approximately seven inches and a width less than approximately five inches. Moreover, the improvement also includes a layer coupling configuration along a layer coupling path with the front surface of the first layer removably coupled to the rear surface of the second layer through the at least one rear and front lower magnets and the at least one rear and front upper magnets and with the article of clothing of the user interposed between the first layer and the second layer.

In accordance with a further feature of the present invention, the rear surface of the first layer and the front surface of the second layer are both of a fabric material.

In accordance with a further feature of the present invention, the first layer and the second layer are operably configured to be substantially planar when in the layer coupling configuration.

Although the invention is illustrated and described herein as embodied in a wearable cell phone cover, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the cover spanning from a lower terminal end to an upper end.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 4 is an elevational side view of the case of FIG. 1;

FIG. 5 is a top plan view of the case of FIG. 1;

FIG. 6 is a perspective view of the case of FIG. 1 in an uncoupled configuration in accordance with one embodiment of the present invention.

DETAILED DESCRIPTION

Figure 1:
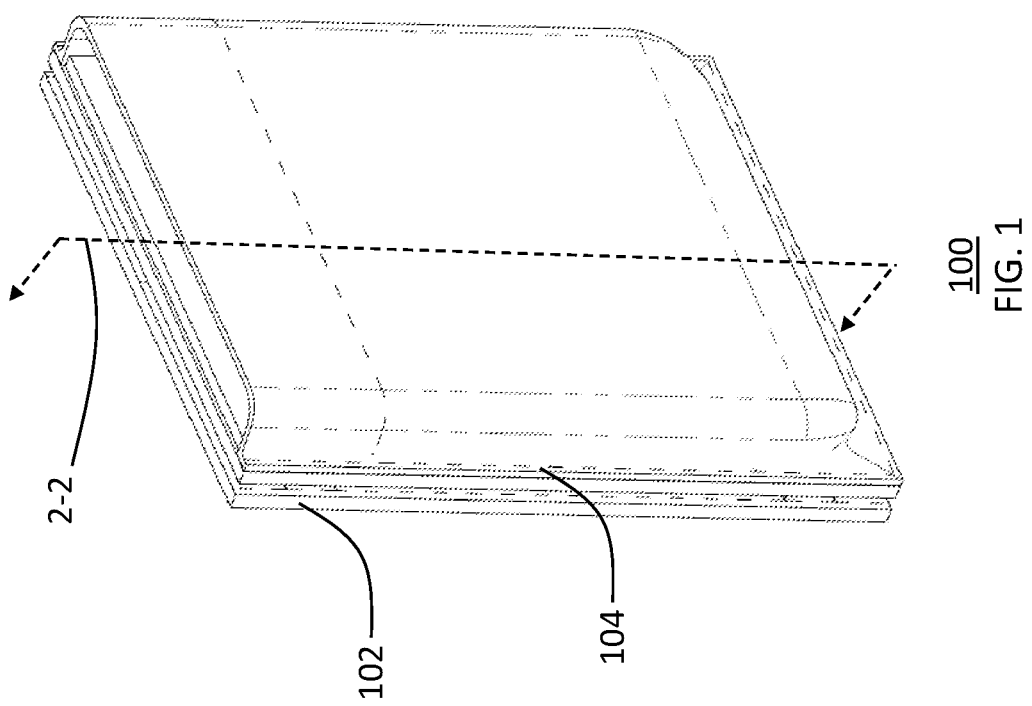
FIG. 1 is downward-looking perspective view of the wearable cell phone case in a layer coupling configuration in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient cell phone cover that is easily and effectively worn by the user. Embodiments of the invention provide a cell phone cover having two portions removably coupleable with one another using magnets. One of the portion defines a pocket shaped and sized to house a cell phone therein and includes an exposed exterior of a fabric material that is designed to be appealing.

Referring now to FIG. 1, one embodiment of the present invention is shown in a downward-looking perspective view. FIG. 1 shows several advantageous features of the present invention, but, as will be described below, the invention can be provided in several shapes, sizes, combinations of features and components, and varying numbers and functions of the components. The first example of a wearable cell phone case 100, as shown in FIG. 1, includes a substantially planar first layer 102 and a substantially planar second layer 104 that are removably couplable to one another through a plurality of specially placed magnets. The first and second layers 102, 104 are substantially planar in that they are operably configured to be relatively flat when pulled in the longitudinal direction by the user. Said another way, the first and second layers 102, 104 may be of a flexible and fabric material that is capable repeated bending without plastic deformation and can be relatively flat when pulled by the user.

Figure 7:
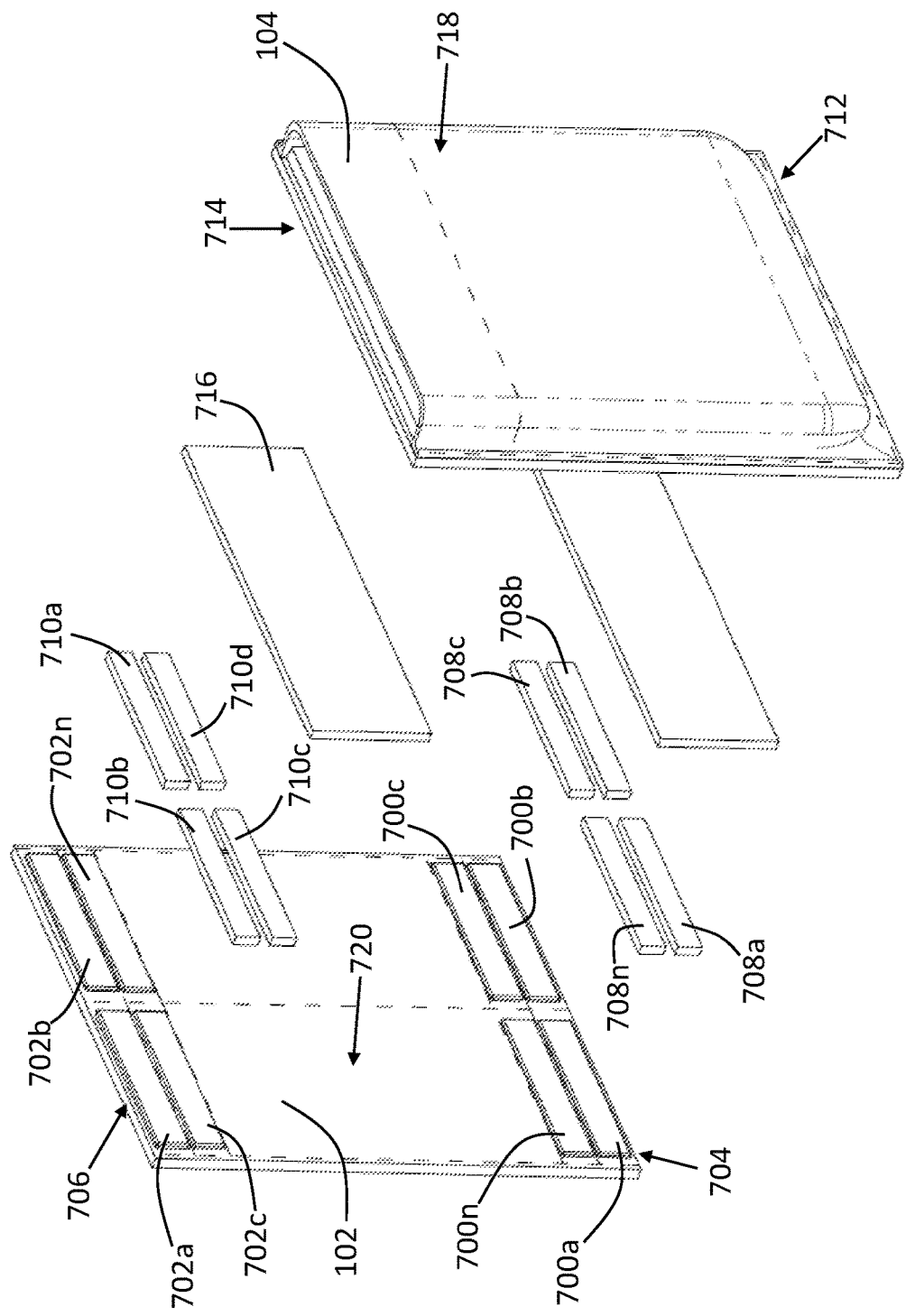
FIG. 7 is an exploded view of the case of FIG. 1.

With reference to FIGS. 1 and 7, the first layer 102 advantageously includes at least one rear lower magnet 700a disposed proximal to a lower end 704 of the first layer 102 and at least one rear upper magnet 702a disposed proximal to the upper end 706 of the first layer 102. As seen in FIG. 7, the upper end 706 is opposing the lower end 704. The term proximal is defined as being disposed at the terminal end of the referencing object or within 10% of the total longitudinal length to the terminal end of the referencing object. Similarly, the second layer 104 also advantageously includes at least one front lower magnet 708a disposed proximal to a lower end 712 of the second layer 104 and at least one rear upper magnet 710a disposed proximal to the upper end 714 of the second layer 104. As seen in FIG. 7, the upper end 714 is opposing the lower end 712. In one embodiment, the magnets 700a, 702a, 708a, 710a are encapsulated within a fabric layup of the first and/or second layers 102, 104, respectively. Thereafter, the magnets 700a, 702a, 708a, 710a may be sewn and retained into place, around their respective outer perimeters, with, for example, fabric stitching. In other embodiments, the magnets 700a, 702a, 708a, 710a may be coupled to either the first or second layers 102, 104 using, for example, adhesive.

With reference to FIGS. 6 and 7, the location of the magnets 700a, 702a, 708a, 710a enables the case 100 to effectively and safely couple to one another, and an article of clothing 600 of a user (represented in FIG. 6), in an appealing and functional manner. The magnets 700a, 702a may be a single magnet substantially spanning a width 602 of the first layer 102 and the magnets 708a, 710a may be a single continuous magnet substantially spanning a width 604 of the second layer 104. Exemplarily widths 602, 604 of the layers 102, 104 may include a length range of approximately 4-12 inches. In other embodiments, a plurality of magnets 700a-n, 702a-n, 708a-n, 710a-n may be utilized, wherein the letter "n" represents any number greater than one.

Specifically, in another embodiment, the case 100 may include at least two rear lower magnets 700a-b disposed in a juxtaposed and independently mobile configuration. The at least two rear lower magnets 700a-b are independently mobile in that they respectively can move or translate (with the fabric of the layer 102 to which it is attached) without necessarily moving and/or translating another magnet disposed adjacent thereto. Additionally, the at least two rear upper magnets 710a-b may also be disposed in a juxtaposed and independently mobile configuration. The layer coupling configuration (best depicted in FIGS. 1, 3, and 4-5) includes the at least two rear lower magnets 700a-b and the at least one front lower magnet 708a-b disposed in the overlapping configuration and includes the at least two rear upper magnets 702a-b and the at least one front upper magnet 710a-b disposed in the overlapping configuration.

In other embodiments, the case 100 may beneficially utilize a 2×2 array of rear and/or front lower magnets 700a-n, 708a-n disposed in a vertically and horizontally juxtaposed and independently mobile configuration as shown in FIG. 7. Moreover, a 2×2 array of rear and/or front upper magnets 702a-n, 710a-n may also be disposed in a vertically and horizontally juxtaposed and independently mobile configuration. In one embodiment, each magnet is individual sewn and retained within the respective layer 102, 104, and operable to move, e.g., fold, irrespective of an adjacent magnet. Furthermore, in the 2×2 array configuration, a set of two magnets, e.g., magnets 702a, 702c, may be disposed on one-half of the layer 102, while another set of magnets, e.g., 702b, 702n, may be disposed on another half of the layer 102. Said another way, each set of magnets may be disposed on sides opposing a median axis along the layer 102 width 602.

As such, the layer(s) 102, 104 are more effectively coupled together to effectuate a more comfortable and efficient movement or placement on the user's article of clothing 600. Said another way, because the layers 102, 104 are employed on a user's article of clothing, which has varying contours and/or shapes depending on the user, the layers 102, 104 are also able to move and shit based on said contour or shape (while maintaining the coupling configuration). The layer coupling configuration may include the one or more of rear lower magnets 700a-n and the one or more front lower magnets 708a-n disposed in the overlapping configuration. Similarly, layer coupling configuration may include the one or more of rear upper magnets 702a-n and the one or more front upper magnets 700a-n disposed in the overlapping configuration.

Figure 2:
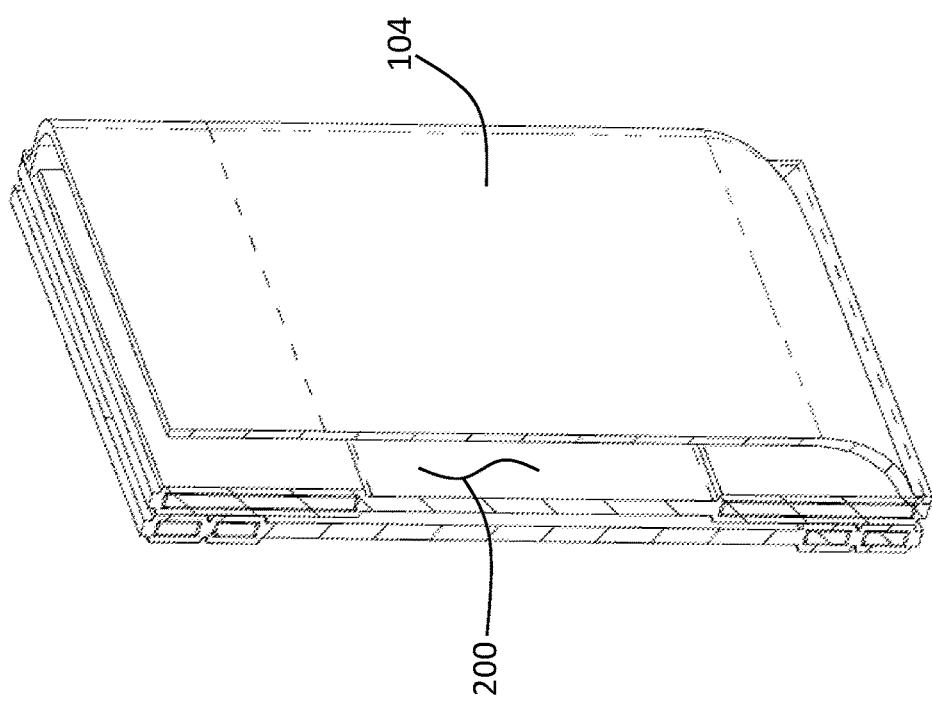
FIG. 2 is a cross-sectional view of the case of FIG. 1 along section line 2-2.

In one embodiment, the one or more magnets 700a-n, 702a-n, 708a-n, 710a-n, when coupled together, are operably configured to produce a magnetic field sufficient to retain, without any external non-magnetic support forces, at least a combined weight of the layers 102, 104 and the weight of a cell phone or other portable electronic device disposed within an enclosed internal cavity 200 (best shown in FIG. 2) defined by the second layer 104. Those of skill in the art will appreciate that to couple two or more of the magnets 700a-n, 702a-n, 708a-n, 710a-n together, they should have opposing polarities and be of a sufficient magnitude to hold or retain at least the combined weight of the case 100 and electrical device, as described above (which may be varied depending on the design application). For example, in one embodiment, each magnet may be operable to generate a magnetic field range of approximately 0.5-4 Teslas. In another embodiment, the magnets 700a-n, 702a-n, 708a-n, 710a-n, when coupled together, are operably configured to produce a magnetic field sufficient to retain at least 10% more than the combined weight of the case 100 and electrical device to reduce the likelihood of movement of the case 100 when coupled to the article of clothing 600 (and to accommodate for user movements generating shifting forces).

Still referring to FIGS. 6 and 7, each of the one or more magnets 700a-n, 702a-n, 708a-n, 710a-n may also include an outer perimeter, e.g., perimeter 606, that surrounds the outer edge of magnet and defines a magnet area (or face area), e.g., area 608. In one embodiment, the magnet area of the at least one front upper magnet 710a may be greater than or equal to the respective magnet areas of the at least two rear upper magnets 702a, 702b. Similarly, the magnet area of the at least one front lower magnet 708c may be greater than or equal to the respective magnet areas of the at least two rear lower magnets 700a, 700b. In another embodiment, the magnet areas of each of the magnets facing or opposing each other, whether configured in an array or otherwise, are substantially equal in size or dimension, i.e., +/−a 10% variance. To facilitate in coupling the one or more magnets 700a-n, 702a-n, 708a-n to the respective layers 102, 104, the case 100 may also employ the use of a support backing, e.g., backing 716, that is more rigid, yet flexible, than the material used for the surfaces of the cover.

Figure 3:
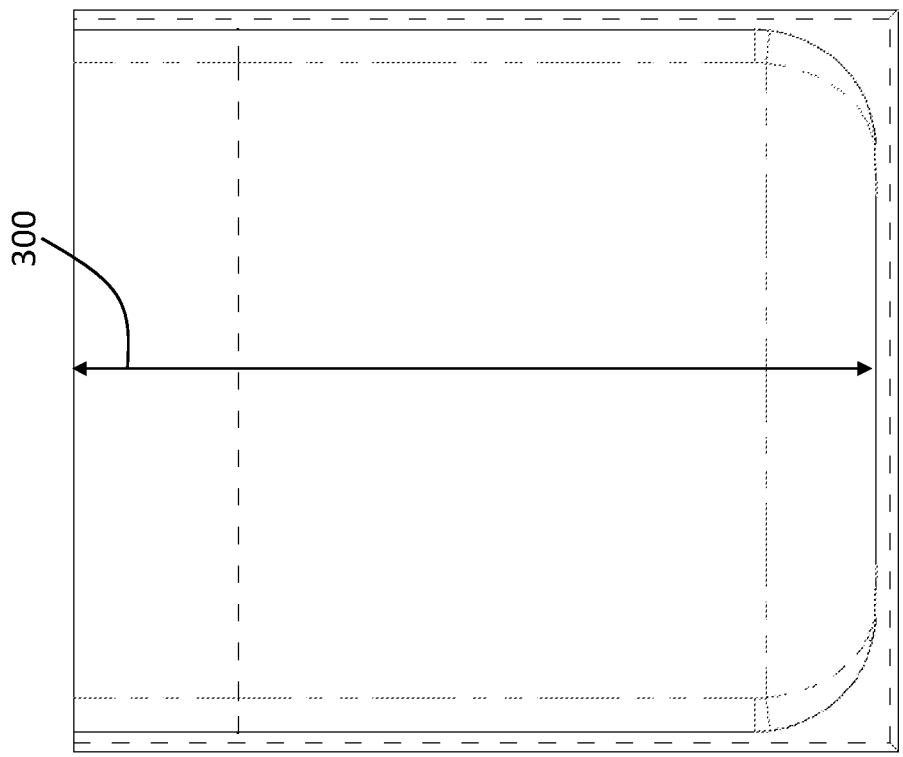
FIG. 3 is an elevational front view of the case of FIG. 1.

With reference now briefly to FIGS. 3-4, each of the layers 102, 104 are preferably of a fabric material, such as acrylic, wool, cotton, etc., to provide a comfortable feeling to the user when worn. The fabric material may be woven or nonwoven, and may be synthetic, formed from animals, plants, or other sources. Additionally, the fabric material, particularly that in which is disposed on a front surface 718 of the second layer 104 corresponds to, matches with, or otherwise is of an appealing design with respect to the outer surface of the user's clothing in which the case 100 is attached. In preferred embodiments, the rear surface 400 of the first layer 102 is also of a fabric material that is sensitive or soft to the touch, e.g., cotton, as this is the surface exposed to the user when worn.

With reference now to FIGS. 1-3 and 5, the second layer 104, particularly the upper edge 500 of the second layer, can be seen defining an upper end aperture 502. Beneficially, the upper end aperture 502 is spatially coupled the enclosed internal cavity 200 that is shaped and sized to house a cellular phone or other equivalent electronic device having, in one embodiment, a length less than approximately seven inches and a width less than approximately five inches. In one embodiment, the internal cavity has a volume equivalent to or greater than the cellular phone or other equivalent electronic device housed therein. Said another way, the cavity 200 may be sized and shaped to snugly fit the electronic device. In one exemplary embodiment, the cavity 200 has approximate dimensions of 0.5 inches in width 504, 3 inches in length 506, and 5 inches in height 300. The overall dimensions of the second layer 104 may have slightly larger dimensions than the enclosed cavity 200. The cavity 200 is enclosed by the inner surfaces of the back member of the second layer 104 and a front flap 508 so the cell phone is housed safely and effectively therein. The inner surfaces may be of a material, e.g., cotton, that has a conducive coefficient of friction facilitating in the removal and entrance of the cell phone. The flap 508 can be seen including the front surface of the second layer 104 and spanning from a left-side edge 510 of the second layer 104 to the right-side edge 512 of the second layer 104. The flap 508 may be permanently joined or directly coupled to the back member of the second layer 104 surrounding the perimeter of the flap 508 using, for example, adhesive or stitching.

Therefore, when desired for use, two or more magnets 700a-n, 702a-n, 708a-n, 710a-n on the first and second layers 102, 104 are uncoupled from one another. The first layer 102 is then inserted or disposed with the front surface 720 of the first layer 102 facing an inner surface of a clothing article, wherein the second layer 104 is then disposed, configured, or placed in an overlapping configuration with first layer 102. Specifically, the magnets disposed on or coupled to the rear surface 402 of the second layer 104 are placed in an overlapping configuration with the magnets disposed on or coupled to the front surface 720 of first layer 102. As such, the first and second layers 102, 104 are then coupled together such that the article of clothing is interposed between the first and second layers 102, 104.

Thereafter, the user then can insert a cell phone or other electronic device within the opening 502 and cavity 200 so it can be safely and effectively housed and/or removed by the case 100 in an appealing and functional manner. In one embodiments, the cavity 200 is sized and shaped such that the cell phone is fully recessed within the cavity 200, while in other embodiments the cell phone is only partially recessed within the cavity 200. To remove the layers 102, 104, the user would simply apply tensile force on one or more portions of at least one of the layers 102, 104 to uncouple the magnetics from one another, i.e., overcome the attractive force generated from the magnetic field.

While the above-described process illustrates a specific order of executing the attachment and removal process (also referred to as a "layer coupling path"), the order of executing the steps may be changed. Moreover, certain steps may have been omitted for the sake of brevity. As such, a cell phone cover is disclosed that provides a user the ability to store and transport a cell phone on a user in an appealing, effective, and desired manner.

What is claimed is:

1. A wearable cell phone case comprising:
a substantially planar first layer with a lower end, an upper end opposing the lower end of the first layer, two opposing side edges, a rear surface, and a front surface opposing the rear surface, both the front and rear surfaces encapsulating at least two rear lower magnets disposed in a juxtaposed, with respect to a median axis of a width separating the two opposing side edges of the first layer, and independently mobile configuration and proximal to the lower end of the first layer and at least two rear upper magnets disposed in a juxtaposed, with respect to the median axis of the width separating the two opposing side edges of the first layer, and independently mobile configuration and proximal to the upper end of the first layer, the first layer free of magnets separating an upper edge of the at least two rear lower magnets and a lower edge of the at least two rear upper magnets;

a substantially planar second layer with a lower end, an upper end opposing the lower end of the second layer and defining an upper end aperture, two opposing side edges, a rear surface, and a front surface opposing the rear surface and of a fabric material, the front surface of the second layer encapsulating at least two front lower magnets disposed in a juxtaposed, with respect to the median axis of the width separating the two opposing side edges of the second layer, and independently mobile configuration and proximal to the lower end of the second layer and at least two front upper magnets disposed in a juxtaposed, with respect to the median axis of the width separating the two opposing side edges of the second layer, and independently mobile configuration and proximal to the upper end of the second layer, the at least two front lower magnets having an opposite polarity to a polarity of the at least two rear lower magnets and the at least two front upper magnets having an opposite polarity to a polarity of the at least two rear upper magnets, the upper end aperture disposed at and enclosed by a terminal upper end of the second layer, the second layer defining an enclosed internal cavity spatially coupled to the upper end aperture, the enclosed internal cavity shaped and sized to house a cellular phone with a length less than approximately seven inches and a width less than approximately five inches, the second layer free of magnets separating an upper edge of the at least two front lower magnets and a lower edge of the at least two front upper magnets; and a layer coupling configuration along a layer coupling path with the front surface of the first layer removably coupled to the rear surface of the second layer and with the at least two rear and front lower magnets disposed in an overlapping configuration and with the at least two rear and front upper magnets disposed in an overlapping configuration.

2. The wearable cell phone case according to claim 1, wherein:
the rear surface of the first layer is of a fabric material.

3. The wearable cell phone case according to claim 1, wherein each of the at least two rear and front lower and upper magnets further comprise:
an outer perimeter defining a magnet area, wherein the magnet area of the at least two front upper magnets is greater than or equal to the magnet area of the at least two rear upper magnets and the magnet area of the at least two front lower magnets is greater than or equal to the magnet area of the at least two rear lower magnets.

4. The wearable cell phone case according to claim 1, wherein each of the at least two rear lower and upper magnets and each of the at least one front lower and upper magnets further comprise:
an outer perimeter defining a magnet area, wherein the magnet area of the at least one front upper magnet is greater than or equal to magnet areas of the at least two rear upper magnets and the magnet area of the at least one front lower magnet is greater than or equal to the magnet areas of the at least two rear lower magnets.

5. The wearable cell phone case according to claim 4, wherein:

the at least two rear lower and upper magnets and the at least one front lower and upper magnets are restrained about their respective outer perimeters through stitching.

6. The wearable cell phone case according to claim 1, wherein:
the layer coupling configuration includes the at least two rear and front lower magnets disposed in respectively independent and overlapping configurations and the at least two rear and front upper magnets are disposed in respectively independent and overlapping configurations.

7. The wearable cell phone case according to claim 1, further comprising:
a 2×2 array of rear lower magnets disposed in a vertically and horizontally juxtaposed and independently mobile configuration; and
a 2×2 array of rear upper magnets disposed in a vertically and horizontally juxtaposed and independently mobile configuration, wherein the layer coupling configuration includes the 2×2 array of rear lower magnets and the at least one front lower magnet disposed in the overlapping configuration and the 2×2 array of rear upper magnets and the at least one front upper magnet disposed in the overlapping configuration.

8. The wearable cell phone case according to claim 1, wherein the second layer includes a left-side edge and a right-side edge opposing the left side edge, and further comprising:
a front flap including the front surface of the fabric material and spanning from the left-side edge of the second layer to the right-side edge of the second layer, the front flap having an inner surface defining the enclosed internal cavity.

9. In combination with an article of clothing of a user having a rear surface and a front surface opposing the rear surface, wherein the improvement comprises:
a wearable cell phone case having:
a first layer with a lower end, an upper end opposing the lower end of the first layer, two opposing side edges, a rear surface, and a front surface opposing the rear surface of the first layer,
at least two rear lower magnets coupled to the front surface of the first layer and disposed in a juxtaposed, with respect to a median axis of a width separating the two opposing side edges of the first layer, and independently mobile configuration and proximal to the lower end of the first layer and at least two rear upper magnets coupled to the front surface of the first layer and disposed in a juxtaposed, with respect to the median axis of the width separating the two opposing side edges of the first layer, and independently mobile configuration and proximal to the upper end of the first layer;
a second layer with a lower end, an upper end opposing the lower end of the second layer and defining an upper end aperture, two opposing side edges, a rear surface, and a front surface opposing the rear surface, the upper end aperture disposed at and enclosed by a terminal upper end of the second layer;
at least two front lower magnets coupled to the rear surface of the second layer and disposed in a juxtaposed, with respect to the median axis of the width separating the two opposing side edges of the second layer, and independently mobile configuration and proximal to the lower end of the second layer and at least two front upper magnet coupled to the rear surface of the first layer and disposed in a juxtaposed, with respect to the median axis of the width separating the two opposing side edges of the second layer, and independently mobile configuration and proximal to the upper end of the second layer, the at least one front lower magnet having an opposite polarity to a polarity of the at least two rear lower magnets and the at least two front upper magnets having an opposite polarity to a polarity of the at least two rear upper magnets, the second layer defining an enclosed internal cavity spatially coupled to the upper end aperture, the enclosed internal cavity shaped and sized to house a cellular phone with a length less than approximately seven inches and a width less than approximately five inches, the second layer free of magnets separating an upper edge of the at least two front lower magnets and a lower edge of the at least two front upper magnets; and a layer coupling configuration along a layer coupling path with the front surface of the first layer removably coupled to the rear surface of the second layer through the at least two rear and front lower magnets and the at least two rear and front upper magnets and with the article of clothing of the user interposed between the first layer and the second layer.

10. The improvement according to claim 9, wherein the layer coupling configuration further comprises:
the front surface of the first layer removably coupled to the rear surface of the second layer with the at least two rear and front lower magnets disposed in an overlapping configuration and with the at least two rear and front upper magnets disposed in an overlapping configuration.

11. The improvement according to claim 9, further comprising:
a 2×2 array of rear lower magnets disposed in a vertically and horizontally juxtaposed and independently mobile configuration; and
a 2×2 array of rear upper magnets disposed in a vertically and horizontally juxtaposed and independently mobile configuration, wherein the layer coupling configuration includes the 2×2 array of rear lower magnets and the at least one front lower magnet disposed in the overlapping configuration and the 2×2 array of rear upper magnets and the at least one front upper magnet disposed in the overlapping configuration.

12. The improvement according to claim 9, wherein:
the rear surface of the first layer and the front surface of the second layer are both of a fabric material.

13. The improvement according to claim 12, wherein:
the first layer and the second layer are operably configured to be substantially planar when in the layer coupling configuration.

14. The improvement according to claim 13, wherein each of the at least two rear and front lower and upper magnets further comprise:
an outer perimeter defining a magnet area, wherein the magnet area of the at least two front upper magnets is greater than or equal to the magnet area of the at least two rear upper magnets and the magnet area of the at least two front lower magnets is greater than or equal to the magnet area of the at least two rear lower magnets.

15. The improvement according to claim 13, wherein:
the layer coupling configuration includes the at least two rear lower magnets and the at least one front lower magnet disposed in the overlapping configuration and includes the at least two rear upper magnets and the at least one front upper magnet disposed in the overlapping configuration.

16. The improvement according to claim 15, wherein each of the at least two rear lower and upper magnets and each of the at least one front lower and upper magnets further comprise:
an outer perimeter defining a magnet area, wherein the magnet area of the at least one front upper magnet is greater than or equal to magnet areas of the at least two rear upper magnets and the magnet area of the at least one front lower magnet is greater than or equal to the magnet areas of the at least two rear lower magnets.

17. The wearable cell phone case according to claim 16, wherein:
the at least two rear lower and upper magnets and the at least one front lower and upper magnets are restrained about their respective outer perimeters through stitching.

* * * * *